Nov. 13, 1951  D. S. MILLER  2,574,795
AUTOMATICALLY RECORDING TORQUE MAGNETOMETER
Filed Jan. 31, 1948  2 SHEETS—SHEET 1

Inventor
Donald S. Miller
By Donald G. Dalton
His Attorney

Patented Nov. 13, 1951

2,574,795

UNITED STATES PATENT OFFICE 2,574,795

AUTOMATICALLY RECORDING TORQUE MAGNETOMETER

Donald S. Miller, Westfield, N. J., assignor to United States Steel Company, a corporation of New Jersey Application January 31, 1948, Serial No. 5,672

14 Claims. (Cl. 175—183)

This invention relates to an automatically recording torque magnetometer and more particularly to such a device for automatically recording the mechanical torque exerted by a uniform magnetic field on a circular disc of sheet iron or steel. The record obtained shows a plot of the torque as a function of the angle between the direction of the field and some reference direction in the disc, which direction is ordinarily taken as the direction of rolling of the sheet material from which the disc is made. This plot is a measure of the magnetic anisotropy of the material. That is, it indicates to the experienced observer the manner in which the magnetization curve of the material depends on the direction in which it is measured. The ultimate cause of the magnetic anisotropy is the crystal structure of the metal and the anisotropy of the mechanical properties is also a result of crystal structure. Therefore, the elastic and plastic properties of the sheet vary with direction in a manner which may, in many cases, be corelated with a magnetic torque curve.

Measurement of magnetic anisotropy have proved to be very useful in two cases: (1) in the manufacture of high grade steel for electric transformer cores in which superior magnetic properties are desired in the rolling direction; and (2) in the production of tin plated sheet steel for use in the manufacture of bottle caps where it is necessary that the steel draw uniformly. Magnetometers for measuring magnetic torque are old, but they have not proved to be completely satisfactory. In some cases the accuracy of the instrument is not sufficient and records of the readings are not obtained automatically.

It is an object of my invention to provide a magnetometer in which the torque exerted on the disc is converted by a resistance strain gage to a small direct current voltage.

Another object is to provide such a magnetometer in which the small direct current voltage is applied to the measuring circuit of a voltage recorder.

These and other objects will be more apparent after referring to the following specification and attached drawings in which.

Figure 1:
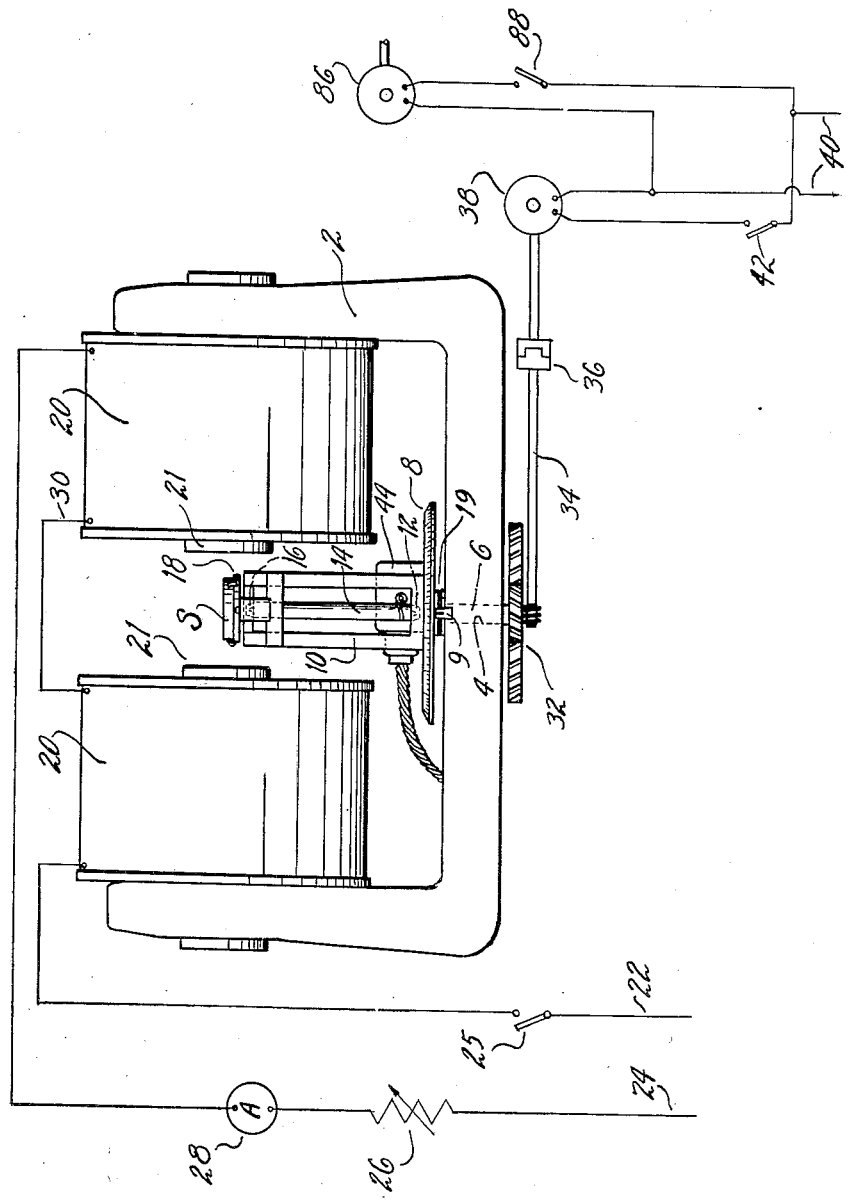
Figure 1 is an elevational view of my invention with a schematic showing of part of the electrical circuits.

Referring more particularly to the drawings, the reference numeral 2 indicates a U-shaped yoke having a hole 4 extending through the base thereof. A rotatable shaft 6 extends through the cylindrical hole 4, which serves as a bearing for the shaft, and has a dial 8 graduated in degrees securely fastened to the top thereof. An index mark 9 is provided on the base of yoke 2 to provide a reference point for dial 8, which point is preferably at right angles to the direction of magnetic flux. Mounted on the dial 8 is a rotor support 10 having a V-jewel 12 mounted in the bottom thereof for supporting the lower end of the rotor 14. The top of the rotor 14 is supported by a V-jewel 16 carried by the top of the support 10. The jewels 12 and 16 are in vertical alignment and act as bearings for rotatably supporting the rotor 14. Mounted for rotation with the rotor 14 is a holder 18 which supports the specimen S for rotation therewith. The weight of rotor support 10 and associated structure is supported by a thrust bearing 19. Magnet coils 20 are supported on cores 21 attached to each leg of the yoke 2, the coils and cores being in axial alignment. Direct current is supplied to the coils 20 from a 100-volt source through the lines 22 and 24, a switch 25 being provided in the line 22. A variable resistance 26 is provided in the line 24 to vary the current flowing in the coils 20, this current being measured by the ammeter 28. The coils 20 are connected by means of wire 30. The yoke 2, the cores 21, and the coils 20 constitute a magnet of conventional design.

Connected to the lower part of the shaft 4 is a gear reducer 22. A shaft 34 connects the gear reducer 32 through a clutch 36 to a motor 38 which is an A. C. 60 cycle 110-volt synchronous motor. Power is supplied to the motor by the lines 40. A switch 42 is provided in the lines 40 to control the flow of current to the motor 38.

Mounted on the dial plate 8 adjacent the rotor support 10 is a strain gage 44. The gage 44 is preferably of the type disclosed on pages 1 to 4 of Catalog G-1 of the Statham Laboratories. This gage consists essentially of a fixed frame 46 having an armature 48 slidably mounted therein. A shaft 50 is connected to the armature 48. Resistance elements 52, 54, 56 and 58 are provided, and being connected as shown, form a Wheatstone bridge.

Figure 2:
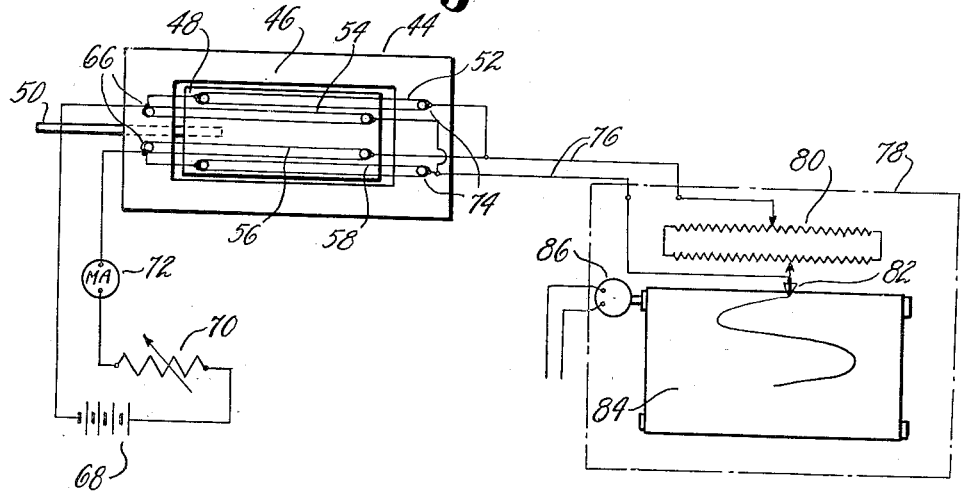
Figure 2 is a diagrammatic view of the strain gage and potentiometer showing the electrical connections therefor.
Figure 3:
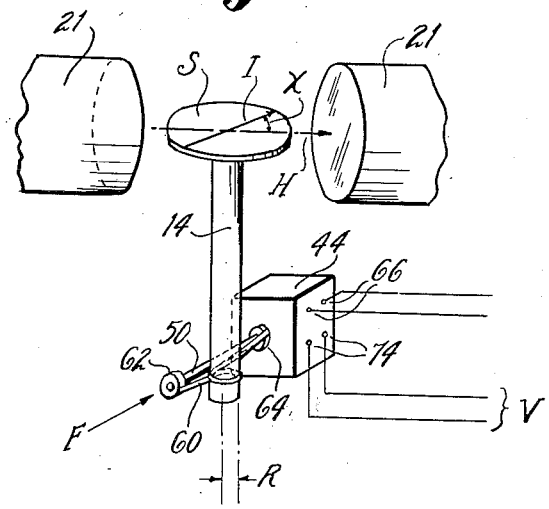
Figure 3 is a diagrammatic view showing the manner in which the torque is transmitted from the specimen to the strain gage.

As shown in Figure 2, resistances 52 and 58 have their left ends connected to the armature 48 and their right ends connected to the frame 46. Resistances 54 and 56 have their right ends connected to the armature 48 and their left ends connected to the frame 46. The resistances 52, 54, 56 and 58 are under mechanical strain in such a manner that displacement of the armature 48 to the left will increase the strain on elements 52 and 58 and decrease it on elements 54 and 56. Movement to the right has the opposite effect. Change in the strain changes the resistance of the elements so that movement of the shaft 50 from the neutral position will unbalance the Wheatstone bridge. The shaft 50 extends past the rotor 14 and is connected thereto by means of a flexible belt 60 wrapped therearound with one end of the belt 60 being connected to a collar 62 and the other end to a collar 64, both of said collars being fastened to the shaft 50. The belt 60 is preferably made of phosphorus-bronze. The point of connection of the belt 60 to collar 62 is radially displaced with respect to the point of connection to collar 64 so that the points of connection are not in the same radial plane of shaft 50. Power is applied to the input terminals 66 of the gage 44 from a 7½ volt dry cell battery 68. Included in the circuit from battery 68 to terminals 66 is a variable resistance 70 which controls the amount of current and a D. C. milliammeter 72 for measuring the current flow. Connected to the output terminals 74 of of the gage 44 are wires 76 leading to a potentiometer recorder 78 having the usual slide wire 80, recording pen 82 and chart 84. The chart 84 is driven by means of a synchronous motor 86 having the same characteristics as motor 38. A switch 88 in the lines 40 controls the flow of current to the motor 86.

The operation of the device is as follows:

A specimen S in the form of a disc is mounted on the workholder 18 which is preferably provided with an index mark corresponding with the zero mark on the dial 8. A similar index mark is preferably provided on the specimen S which in most cases will indicate the rolling direction. A magnetic field is then provided by closing the switch 25. Motor 86 is driven until a graduation line on the time scale of the chart paper coincides with the point of the recorder pen 82. The clutch 36 is disengaged and the shaft 34 rotated by hand to set the dial 8 in the desired starting position in which the zero graduation on 8 is a few degrees from the fixed index 9 in a clockwise direction. Clutch 36 is reengaged and switch 42 is closed, thus starting rotation of dial 8 and specimen S in counterclockwise direction. At the instant the zero graduation on 8 coincides with index mark 9, switch 88 is closed starting motion of the chart paper and operation of the recorder balancing mechanism. The graduation line on the chart on which the pen 82 was set then corresponds to the zero graduation on dial 8. Since the timing is so arranged that one inch motion of the chart takes place in the same time interval as 15° rotation of dial 8, the complete angular scale on the chart can be marked by counting of inch graduations.

The torque T exerted on the specimen S at any time is equal to HI sine X, where:

H is the applied magnetic field;
I is the magnetization in the specimen; and
X is the angle between the field and the magnetization.

This torque is transferred to the rotor 14 causing it to rotate through a small angle.

The force F applied to the strain gage 44 is equal to $$\frac{T}{R}$$

where

R is the radius of rotor 14.

The output V of the strain gage 44 in millivolts is equal to a constant K times F, so that $$V = \frac{K}{R} \cdot T$$

Thus, the voltage output from the strain gage is directly proportional to the torque exerted on the disc.

Rotation of the rotor 14 is transferred to the shaft 50 by means of the belt 60, thus displacing the shaft and armature 48 to change the value of the resistances in the Wheatstone bridge which changes the voltage output from the strain gage. This voltage is recorded on the chart 84 and since the motors 38 and 86 are driven in synchronism, a record is obtained showing torque as a function of the angular displacement of the zero graduation on dial 8 relative to the direction of the field. If the various values of torque are desired for only a few particular orientations of the disc S with respect to the field a simple millivoltmeter may be attached to the wires 76. In such a case the torque, of course, would not be recorded automatically. The constant for converting the electrical output recorded on the chart 84 into torque is defined by the following equation:

$$K_t = \frac{T \cdot I_t}{E}$$

where:

$K_t$ = torque constant of gage in $\frac{\text{dyne-cm·milliamperes}}{\text{millivolts}}$ $T$ = torque applied to the gage in dyne-centimeters
$I_t$ = current input to the gage in milliamperes
$E$ = output of the gage in millivolts By using a recorder whose range is one-fifth of the maximum output of the torsion gage, it is possible to vary the factor for converting voltage to torque by a ratio of 5 to 1. This is done by varying the variable resistance 70, thus changing the current input to the strain gage. Therefore, by using a high gage current in specimens on which a low torque is obtained and a low gage current with specimens from which a high torque is obtained the records may be made of about equal amplitude over a 5 to 1 range of torque maxima.

The equation set forth directly above can also be used for calibration of the torsion gage and for determination of the gage current which will provide a convenient torque scale on the chart paper. The calibration is obtained by applying a known torque, supplying a known current to the strain gage, measuring the millivolt output of the strain gage and then solving the equation for $K_t$ when using these values. In like manner, knowing the value of $K_t$, the maximum torque value to be measured, and the maximum millivolt reading on the recorder, it is possible to solve the equation for the desired input gage current required to keep the output reading on the chart paper.

While one embodiment of my invention has been shown and described, it will be apparent that other adaptations and modifications may be made without departing from the scope of the following claims.

I claim:

1. A torque magnetometer for measuring the torque exerted by a magnetic field on a specimen of magnetic material comprising a rotor for supporting said specimen for rotation therewith, a magnet for creating the magnetic field, said specimen being located in said magnetic field, a strain gage for measuring the torque exerted by the magnetic field on said specimen, and a connection between said strain gage and said rotor.

2. A torque magnetometer for measuring the torque exerted by a magnetic field on a specimen of magnetic material comprising a rotor for supporting said specimen for rotation therewith, a magnet for creating the magnetic field, said specimen being located in said magnetic field, a strain gage, a shaft extending from said strain gage to said rotor, a connection between said rotor and said shaft for reciprocating said shaft when said rotor rotates, a Wheatstone bridge in said strain gage, the resistance in said Wheatstone bridge varying as the shaft is reciprocated, and means for measuring the voltage output of said strain gage.

3. A torque magnetometer for measuring the torque exerted by a magnetic field on a specimen of magnetic material comprising a rotor for supporting said specimen for rotation therewith, a magnet for creating the magnetic field, said specimen being located in said magnetic field, a rotatable support for said rotor, a strain gage mounted on said support, a shaft extending from said strain gage to said rotor, a connection between said rotor and said shaft for reciprocating said shaft when said rotor rotates with respect to said rotatable support, a Wheatstone bridge in said strain gage, the resistances in said Wheatstone bridge varying as the shaft is reciprocated, and means for measuring the voltage output of said strain gage.

4. A torque magnetometer for measuring the torque exerted by a magnetic field on a circular disc of magnetic material which comprises a vertical rotor for supporting said disc for rotation therewith, a magnet for creating the magnetic field, said disc being located in said magnetic field, a strain gage for measuring the torque exerted by said magnet on said disc, and a connection between said strain gage and said rotor.

5. A torque magnetometer for measuring the torque exerted by a magnetic field on a circular disc of magnetic material which comprises a vertical rotor for supporting said disc for rotation therewith, a magnet, said disc being located between the poles of said magnet, a rotatable support for said rotor, a strain gage mounted on said support, and a connection between said strain gage mounted on said support, and a connection between said strain gage and said rotor.

6. A torque magnetometer for measuring the torque exerted by a magnetic field on a circular disc of magnetic material which comprises a vertical rotor for supporting said disc for rotation therewith, a magnet, said disc being located between the poles of said magnet, a rotatable support for said rotor, a strain gage mounted on said support, means connecting said rotor to said strain gage, electrical means associated with said strain gage for obtaining a voltage output proportional to said torque, and means for measuring the voltage output of said gage to determine said torque.

7. A torque magnetometer for measuring the torque exerted by a magnetic field on a circular disc of magnetic material which comprises a vertical rotor for supporting said disc for rotation therewith, a magnet, said disc being located between the poles of said magnet, a rotatable support for said motor, a strain gage mounted on said support, means connecting said rotor to said strain gage, electrical means associated with said strain gage for obtaining a voltage output proportional to said torque, a recording potentiometer connected to the voltage output of said strain gage, a chart paper in said recording potentiometer and means for moving said chart paper and said rotatable support in synchronism.

8. A torque magnetometer for measuring the torque exerted by a magnetic field on a circular disc of magnetic material which comprises a vertical rotor for supporting said disc for rotation therewith, a magnet, said disc being located between the poles of said magnet, a rotatable support for said rotor, a strain gage mounted on said support, a shaft extending from said strain gage to said rotor, electrical means associated with said strain gage for obtaining a voltage output proportional to said torque, a connection between said rotor and said shaft for reciprocating said shaft when said rotor rotates to vary the voltage output of said gage, and means for measuring the voltage output of said gage to determine said torque.

9. A torque magnetometer for measuring the torque exerted by a magnetic field on a circular disc of magnetic material which comprises a vertical rotor for supporting said disc for rotation therewith, a magnet, said disc being located between the poles of said magnet, a rotatable support for said rotor, a strain gage mounted on said support, a shaft extending from said strain gage to said rotor, a connection between said rotor and said shaft for reciprocating said shaft when said rotor rotates, electrical means associated with said strain gage for obtaining a voltage output proportional to said torque, a recording potentiometer connected to the voltage output of said strain gage, a chart paper in said recording potentiometer and means for moving said chart paper and said rotatable support in synchronism.

10. A torque magnetometer for measuring the torque exerted by a magnetic field on a circular disc of magnetic material which comprises a vertical for supporting said disc for rotation therewith, a magnet, said disc being located between the poles of said magnet, a rotatable support for said rotor, a strain gage mounted on said support, a shaft extending from said strain gage to said rotor, a connection between said rotor and said shaft for reciprocating said shaft when said rotor rotates, a Wheatstone bridge in said strain gage, the resistances in said Wheatstone bridge varying as the shaft is reciprocated, and means for measuring the voltage output of said gage to determine said torque.

11. A torque magnetometer for measuring the torque exerted by a magnetic field on a circular disc of magnetic material which comprises a vertical rotor for supporting said disc for rotation therewith, a magnet, said disc being located between the poles of said magnet, a rotatable support for said rotor, a strain gage mounted on said support, a shaft extending from said strain gage to said rotor, a connection between said rotor and said shaft for reciprocating said shaft when said rotor rotates, a Wheatstone bridge in said strain gage, the resistances in said Wheatstone bridge varying as the shaft is reciprocated, a recording potentiometer connected to the voltage output of said strain gage, a chart paper in said recording potentiometer and means for moving said chart paper and said rotatable support in synchronism.

12. A torque magnetometer for measuring the torque exerted by a magnetic field on a circular disc of magnetic material which comprises a vertical rotor for supporting said disc for rotation therewith, a magnet, said disc being located between the poles of said magnet, a rotatable support, bearings in said support for rotatably receiving said rotor, a graduated dial connected to said support, a strain gage mounted on said dial, a shaft extending from said strain gage to said rotor, a connection between said rotor and said shaft for reciprocating said shaft when said rotor rotates, and means for measuring the output of said gage to determine said torque.

13. A torque magnetometer for measuring the torque exerted by a magnetic field on a circular disc of magnetic material which comprises a vertical rotor for supporting said disc for rotation therewith, a magnet, said disc being located between the poles of said magnet, a rotatable support, bearings in said support for rotatably receiving said rotor, a graduated dial connected to said support, a strain gage mounted on said dial, a shaft extending from said strain gage to said rotor, electrical means associated with said strain gage for obtaining a voltage output proportional to said torque, a connection between said rotor and said shaft for reciprocating said shaft when said rotor rotates, a recording potentiometer connected to the voltage output of said strain gage, a chart paper in said recording potentiometer and means for moving said chart paper and said rotatable support in synchronism.

14. A torque magnetometer for measuring the torque exerted by a magnetic field on a circular disc of magnetic material which comprises a vertical rotor for supporting said disc for rotation therewith, a magnet, said disc being located between the poles of said magnet, a rotatable support, bearings in said support for rotatably receiving said rotor, a graduated dial connected to said support, a strain gage mounted on said dial, a shaft extending from said strain gage to said rotor, a connection between said rotor and said shaft for reciprocating said shaft when said rotor rotates, a Wheatstone bridge in said strain gage, the resistances in said Wheatstone bridge varying as the shaft is reciprocated, a recording potentiometer connected to the voltage output of said strain gage, a chart paper in said recording potentiometer and means for moving said chart paper and said rotatable support in synchronism.

DONALD S. MILLER.

REFERENCES CITED

The following references are of record in the file of this patent:

UNITED STATES PATENTS

| Number | Name | Date |
|---|---|---|
| 2,046,717 | Bitter | July 7, 1936 |
| 2,147,942 | Wright | Feb. 21, 1939 |
| 2,300,336 | Bozorth et al. | Oct. 27, 1942 |
| 2,423,620 | Ruge | July 8, 1947 |
| 2,453,551 | Statham | Nov. 9, 1948 |